United States Patent [19]

Muller

[11] Patent Number: 5,171,425

[45] Date of Patent: Dec. 15, 1992

[54] PROCESS FOR UPGRADING A SULFUR-CONTAINING FEEDSTOCK

[75] Inventor: Frederik Muller, Amsterdam, Netherlands

[73] Assignee: Shell Oil Company, Houston, Tex.

[21] Appl. No.: 705,443

[22] Filed: May 24, 1991

[30] Foreign Application Priority Data

Nov. 9, 1990 [GB] United Kingdom ............... 9024459

[51] Int. Cl.$^5$ ...................... C10G 45/12; C10G 45/22; C10G 45/60; C01B 33/34
[52] U.S. Cl. ............................. 208/208 R; 208/213; 423/329.1
[58] Field of Search .................... 208/208 R, 213; 423/328

[56] References Cited

U.S. PATENT DOCUMENTS

| 4,458,024 | 7/1984 | Oleck | 502/66 |
| 4,510,044 | 4/1985 | Oleck | 208/111 |

FOREIGN PATENT DOCUMENTS

| 252705 | 7/1987 | European Pat. Off. . |
| 271264 | 11/1987 | European Pat. Off. . |

Primary Examiner—Theodore Morris
Assistant Examiner—Zeinab El-Ariini

[57] ABSTRACT

Process for upgrading a sulfur-containing feedstock comprising a hydrocarbon mixture substantially boiling in the gasoline range which process comprises the following steps:

1) contacting the feedstock of a temparature of about 300° C. to about 600° C., a pressure of about 1 bar to about 40 bar and a space velocity of about 0.5 to about 10 g/g/h, with a catalyst which comprises a crystalline (metallo)silicate having an X-ray diffraction pattern containing the four strongest lines at interplanar spacings (d) expressed in Å, of 11.1±0.2, 10.0±0.2, 3.84±0.07 and 3.72±0.06, and 2) contacting at least a fraction of the product obtained in step 1) at a temperature of about 200° C. to about 600° C., a pressure of about 20 bar to about 100 bar and a space velocity of about 0.5 to about 20 g/g/h, with a catalyst which comprises a crystalline (metallo)silicate having a similar X-ray diffraction pattern as defined hereinabove, and recovering therefrom a product substantially boiling in the gasoline range, said product having an improved octane quality and decreased sulfur content.

10 Claims, No Drawings

PROCESS FOR UPGRADING A SULFUR-CONTAINING FEEDSTOCK

FIELD OF THE INVENTION

The present invention relates to a process for upgrading a sulfur-containing feedstock and is particularly concerned with improving the quality of a feedstock which comprises hydrocarbons boiling in the gasoline range obtained by catalytic cracking.

BACKGROUND OF THE INVENTION

Gasoline obtained by catalytic cracking requires further processing before it can satisfactorily meet the present day stringent requirements for high octane and low sulfur content. Thus, catalytically cracked gasoline has a comparatively high olefin content, a low aromatics content and if there has been no initial treatment of the feedstock, an unacceptable high sulfur content. Quality improvement may be carried out by catalytic reforming with platinum-containing reforming catalysts. However, the presence of sulfur- and nitrogen-containing compounds in the reformer feedstock reduces the catalyst performance and removal of such compounds by catalytic hydrotreatment is considered necessary prior to reforming, with a consequent increase in cost.

It has been proposed in accordance with European Patent No. A-271264 to employ a platinum-containing Y-type zeolite catalyst in a single stage process for reducing the sulphur content and increasing the octane number of an olefin-containing feedstock. However, as mentioned above, platinum-containing catalysts are readily poisoned by sulfur- and nitrogen-containing compounds. They are also expensive and difficult to regenerate. There is, therefore, a need to provide an alternative upgrading process which does not rely on platinum and which can be used with sulfur-containing feedstocks without the requirement for initial hydrotreatment.

European Patent No. A-252705 desribes a process for producing aromatic compounds from feedstocks containing at least 50% wt $C_{2-12}$ aliphatic hydrocarbons, using a gallium-containing ZSM-5 type catalyst having a silica/alumina mole ratio greater than 10. The process is exemplified solely by the aromatization of n-hexane to an aromatics-containing product, the aromatics selectivity being increased when the catalyst has been prepared by insertion of the gallium into the framework of the zeolite under alkaline conditions. European Patent No. A-252705 contains no teaching to suggest that the process would be applicable to a sulfur-containing commercial mixed feedstock such as gasoline obtained by catalytic cracking, let alone teaching to the effect that use of such a catalyst would promote the simultaneous aromatization and desulfurization of a sulfur-containing feedstock. Indeed the teaching of the above-mentioned European Patent No. A-271264, which shares the same applicant as EP-A-252705, is that, although many crystalline silicate zeolites are now known to the prior art, it is necessary to resort to a noble metal-containing crystalline zeolite catalyst in order to effect simultaneous reduction of sulfur content and increase of octane when processing an olefinic gasoline from cracking processes.

It has now been found that a (mixed) feedstock containing an unacceptable high portion of sulfur and substantially boiling in the gasoline range, suitably a feedstock derived from catalytic cracking, can very attractively be upgraded in respect of both sulfur-content and octane quality in a two-stage process which does not rely on noble metals and whereby, in both stages, use is made of a catalyst comprising a crystalline (metallo)silicate having a specific X-ray diffraction pattern.

SUMMARY OF THE INVENTION

The present invention therefore relates to a process for upgrading a sulfur-containing feedstock comprising a hydrocarbon mixture substantially boiling in the gasoline range which process comprises the following steps:

1) contacting the feedstock at a temperature of about 300° C. to about 600° C., a pressure of about 1 bar to about 40 bar and a space velocity of about 0.5 to about 10 g/g/h, with a catalyst comprising a crystalline (metallo)silicate having an X-ray diffraction pattern containing the four strongest lines at interplanar spacings (d) expressed in Angstroms (Å), of 11.1±0.2, 10.0±0.2, 3.84±0.07 and 3.72±0.06, and 2) subsequently contacting at least a fraction of the product obtained in step 1) at a temperature of about 200° C. to about 600° C., a pressure of about 20 bar to about 100 bar and a space velocity of about 0.5 to about 20 g/g/h, with a catalyst comprising a crystalline (metallo)silicate having an X-ray diffraction pattern containing the four strongest lines at interplanar spacings (d) expressed in Å, of 11.1±0.2, 10.0±0.2, 3.84±0.07 and 3.72±0.06, and recovering therefrom a product substantially boiling in the gasoline range and having improved octane quality and decreased sulfur content.

DESCRIPTION OF THE PREFERRED EMBODIMENTS

The X-ray data quoted above was obtained of the Cu-$K_\alpha$ X-rays as is well known in the art.

The hydrocarbon mixture boiling in the gasoline range is preferably obtained by catalytic cracking although it may be obtained by other cracking processes such as thermal cracking, delayed coking, visbreaking and flexicoking. Such gasoline feedstocks usually contain unacceptable levels of sulfur, usually more than 50 ppmw, often above 100 ppmw. Gasoline feedstocks containing more than 250 ppmw, or even more than 500 ppmw of sulfur are suitably upgraded in a process according to the present invention.

Other suitable feedstocks to be processed in accordance with the present invention comprise substantially naphthenes-containing hydrocarbon mixtures, for instance straight-run naphthas, or mixtures of hydrocarbonaceous material which may be derived from a cracking process and substantially naphthenes-containing hydrocarbonaceous material.

The feedstock to be processed is suitably a mixture obtained by catalytic cracking, usually fluid catalytic cracking of heavy hydrocarbon oils, such as vacuum gas oils, flashed distillates, long residues, deasphalted vacuum residues and mixtures thereof. Fluid catalytic cracking on a commercial scale is usually carried out in a continuous process using an arrangement which consists substantially of a vertically arranged cracking reactor and a catalyst regenerator. The oil to be cracked is brought in contact with the hot regenerated catalyst coming from the regenerator. The mixture of oil and catalyst is passed through the reactor section in an upward direction. In the reactor section, coke is deposited on the catalyst, a result of which the catalyst is deactivated. The deactivated catalyst is separated from the product obtained and, after stripping, transported to the regenerator. The cracked product is separated into a light fraction having a high content of $C_2$ to $C_4$ olefins, a gasoline fraction and several heavy fractions, such as a light cycle oil, a heavy cycle oil and a slurry oil.

The sulfur containing feedstock may consist entirely of a fraction substantially boiling in the gasoline range, i.e. substantially boiling in the range of about 40° C. to about 220° C. However, other light components, capable of benefitting the octane quality, may be co-processed in step 1) and/or step 2), for example, a hydrocarbon mixture substantially comprising normally gaseous olefins and/or paraffins such as $C_{2-5}$ olefins and/or $C_{1-7}$ paraffins. Especially a hydrocarbon mixture substantially comprising $C_{1-4}$ paraffins can suitably be co-processed in step 1) and/or step 2).

While the full gasoline boiling range fraction from the cracking may be included in the feedstock, it is preferred to employ as hydrocarbon mixture a cut thereof substantially boiling in the range of about 70° C. to about 220° C., preferably in the range of about 70° C. to about 180° C. Preferably, the sulfur-containing feedstock consists essentially of a hydrocarbon mixture boiling in the gasoline range. Hydrogen may be co-processed with the gasoline feedstock and may improve the desulfurization. It should, however, be applied in quantities compatible with an acceptable gas make.

Although not preferred, it will be understood that part of the effluent from step 1) can be subjected to a separation treatment.

In the process according to the present invention, identical or different crystalline (metallo)silicates can be used in steps 1) and 2).

Preferably, the catalysts to be used in steps 1) and 2) comprise crystalline (metallo)silicate such as ZSM-5, silicalite, iron-containing crystalline aluminosilicates or iron-containing crystalline silicates having the X-ray diffraction pattern as described hereinbefore. More preferably, the catalysts to be used in steps 1) and 2) comprise ZSM-5.

Suitably a catalyst can be applied in steps 1) and 2) which comprises a crystalline aluminosilicate having a $SiO_2/Al_2O_3$ molar ratio of at least 20 and the X-ray diffraction pattern as described hereinbefore. Preferably, the catalyst to be applied in step 1) comprises a crystalline aluminosilicate having a $SiO_2/Al_2O_3$ molar ratio of at least 50. Preferably, the catalyst to be applied in step 2) comprises a crystalline aluminosilicate having a $SiO_2/Al_2O_3$ molar ratio of 20 to 200.

Suitably, a catalyst can be applied in steps 1) and 2) which comprises an iron-containing crystalline silicate. Preference is given to iron-containing crystalline silicates having a $SiO_2/Fe_2O_3$ molar ratio of 25 to 1000. In case a catalyst is applied in steps 1) and 2) which comprises an iron-containing aluminosilicate, the catalyst preferably has a $SiO_2/Fe_2O_3$ molar ratio of 25 to 1000 and a $SiO_2/Al_2O_3$ molar ratio of at least 20. Suitably such iron-containing aluminosilicate has a $SiO_2/Al_2O_3$ molar ratio of 20 to 2000 in step 1) and a $SiO_2/Al_2O_3$ molar ratio of 20 to 200 in step 2).

The catalyst to be used in step 1) may comprise a metal (M)-containing crystalline (metallo)silicate wherein M is at least one metal of the group of Ga, Mo, W and Zn.

Such a metal (M)-containing crystalline (metallo)silicate suitably contains from about 0.01 to 10% by weight, preferably from about 0.1 to 5% by weight of the metal (s). Preferably, gallium or zinc is used as metal, more preferably gallium.

The crystalline (metallo)silicates may be prepared by methods known in the art, for example from aqueous solution containing the following compounds: one or more compounds of an alkali metal, one or more organic nitrogen compounds (RN) containing an organic cation or from which an organic cation is formed during the preparation of the (metallo)silicate, one or more silicon compounds and one or more aluminum compounds. Preparation is effected by maintaining the mixture at an elevated temperature until the (metallo)silicate has been formed and then separating the (metallo)silicate crystals from the mother liquor and washing, drying and calcining the crystals.

Many synthetic routes exist to prepare these catalysts. An extensive discussion can be found in "Hydrothermal Chemistry of Zeolites" by R. M. Barrer, Academic Press, New York, 1982.

The crystalline (metallo)silicates as prepared often contain alkali metal ions. By means of suitable exchange means these can be replaced by other cations, such as hydrogen ions or ammonium ions. The crystalline (metallo)silicates employed in the process according to the present invention preferably have an alkali metal content of less than 0.05% by weight. In the process according to the present invention, the crystalline (metallo)silicates can be used as such or in combination with an inert binding material, such as kaolin or bentonite.

In the event that the catalyst to be applied in step 1) comprises a metal (M)-containing crystalline (metallo)silicate the metal(s) is (are) 2 preferably introduced into the silicate after crystallization of the (metallo)silicate, for instance, by post-impregnation. This is suitably effected by ion exchange of the (metallo)silicate, preferably in its H+ or ammonium form, under neutral or acidic conditions with an aqueous solution of one or more metal salts of the appropriate metal, followed by drying and calcining for a period of preferably from about 0.1 to about 10 hours at a temperature of preferably from about 400° C. to about 700° C. When gallium is used as metal, preferably gallium-containing metal salts such as gallium sulfate, gallium chloride or, preferably, gallium nitrate are used.

In the process according to the present invention, step 1) is preferably carried out at a temperature of about 400° C. to about 550° C., a pressure of from about 10 to about 30 bar and a space velocity of from about 0.5 to about 5 g/g/h. Step 2) is preferably carried out at a temperature of about 250° C. to about 550° C., a pressure of from about 30 bar to 90 bar and a space velocity of from about 1.0 to about 10 g/g/h.

The process according to the present invention can be carried out using a series of reactors or in a stacked-bed configuration. Use of a series of reactors containing the respective catalysts is preferred.

The desired gasoline boiling range product of improved octane quality and reduced sulfur content may be recovered by any suitable means, usually by fractionation.

Suitably the product obtained in the process according to the present invention is subsequently subjected to a hydrotreatment to decrease the sulfur content even further.

The present invention will now be illustrated by means of the following example which is illustrative and which is not intended to be construed as limiting the invention.

EXAMPLE a) Composition of catalysts

Catalysts A and B comprise a commercial available ZSM-5 type crystalline zeolite having a $SiO_2/Al_2O_3$ molar ratio of 150 and 30 respectively.

b) Catalysts A and B were respectively employed in steps 1) and 2) during 100 hours in an experiment according to the present invention. The effluent of step 1) is subsequently subjected to step 2). As feedstock a catalytically cracked gasoline was used having the following properties:

| Boiling range | 85–175° C. |
|---|---|
| Olefins in $C_5^+$ (% wt) | 19.2 |
| Saturates in $C_5^+$ (% wt) | 44.5 |
| Aromatics in $C_5^+$ (% wt) | 36.3 |
| Sulfur in $C_5^+$ (ppmw) | 1260 |
| RON-O of $C_5^+$ | 85 |

The operation conditions under which the experiment was carried out and the results obtained are given in Table 1 as shown hereinafter.

TABLE 1

| Catalyst | A | B |
|---|---|---|
| conditions | | |
| Temperature (°C.) | 450 | 400 |
| Pressure (bar) | 20 | 60 |
| WHSV (g/g/h) | 1.0 | 4.95 |
| Products | | |
| $C_5^+$ yield (% wt) | | 83 |
| Sulfur in $C_5^+$ (ppmw) | | 950 |
| Aromatics in $C_5^+$ (% wt) | | 69 |
| RON-O of $C_5^+$ | | 97 |

What is claimed is:

1. A process for upgrading a sulfur-containing feedstock comprising a hydrocarbon mixture boiling in a range of from about 70° C. to about 220° C. which process comprises the following steps:
   1) contacting the feedstock at a temperature of about 300° C. to about 600° C., a pressure of about 1 bar to about 40 bar and a space velocity of about 0.5 to about 10 g/g/h, with a catalyst comprising a crystalline (metallo)silicate having an X-ray diffraction pattern containing the four strongest lines at interplanar spacing (d) expressed in Å, of 11.1±0.2, 10.0±0.2, 3.84±0.07 and 3.72±0.06, and
   2) contacting at least a fraction of the product obtained in step 1) at a temperature of about 200° C. to about 600° C., a pressure of about 20 bar to about 100 bar and a space velocity of about 0.5 to about 20 g/g/h, with a catalyst comprising a crystalline (metallo)silicate having an X-ray diffraction pattern containing the four strongest lines at interplanar spacings (d) exposed in Å, of 11.1±0.2, 10.0±0.2, 3.84±0.07 and 3.72±0.06, and recovering therefrom a product boiling in the range of from about 70° C. to about 220° C. having improved octane quality and decreased sulfur content.

2. The process according to claim 1, wherein said hydrocarbon mixture is obtained by catalytic cracking.

3. The process according to claim 1, wherein the sulfur-containing feedstock comprises more than about 50 ppmw of sulfur.

4. The process according to claim 1, wherein said process additionally comprises co-processing hydrogen with the feedstock.

5. The process according to claim 1, wherein said hydrocarbon mixture is selected from the group consisting of $C_{2-5}$ olefins, $C_{1-7}$ paraffins, and mixtures thereof.

6. The process according to claim 1, wherein the crystalline (metallo)silicate in steps 1) and 2) is a crystalline aluminosilicate having a $SiO_2/Al_2O_3$ molar ratio of at least about 20.

7. The process according to claim 1, wherein the crystalline (metallo)silicate applied in steps 1) and 2) is an iron-containing (alumino)silicate having a $SiO_2/Fe_2O_3$ molar ratio of about 25 to about 1000.

8. The process according to claim 1, wherein step 1) is carried out at a temperature of about 400° C. to about 550° C., a pressure of from about 10 bar to about 30 bar and a space velocity of from about 0.5 g/g/h to about 5 g/g/h.

9. The process according to claim 1, wherein step 2) is carried out at a temperature of about 250° C. to about 550° C., a pressure of from about 30 bar to about bar and a space velocity of from about 1.0 g/g/h to 10 g/g/h.

10. The process according to claim 1, wherein the product recovered from step 2) is subsequently subjected to a hydrotreating step.

* * * * *